Patented Oct. 23, 1928.

1,688,758

UNITED STATES PATENT OFFICE.

WINFIELD SCOTT, OF AKRON, OHIO, ASSIGNOR TO THE RUBBER SERVICE LABORATORIES COMPANY, OF AKRON, OHIO, A CORPORATION OF OHIO.

MANUFACTURE OF VULCANIZED RUBBER AND PRODUCT THEREOF.

No Drawing.　　　Application filed April 8, 1927. Serial No. 182,188.

The present invention relates to the process of manufacturing a vulcanized rubber product by employing as an accelerator of that process a dissimilar-aryl di-substituted-guanidine of the type hereinafter set forth in detail. The invention will be understood from the following description and examples wherein the invention is fully explained.

Di-phenyl-guanidine and di-ortho-tolyl-guanidine have heretofore been described as representatives of the class of di-substituted-guanidine accelerators. While the two compounds mentioned are accelerators of the rubber vulcanization process, I have found that as a class, all di-substituted-guanidines do not possess this property, and furthermore that many of the compounds of this class that do accelerate the process mentioned, are not sufficiently active as to be commercially practicable for use in this process.

The nature and type of the radical introduced into the guanidine nucleus generally has a profound effect upon the vulcanization accelerating properties and the resulting compound. Many of the di-substituted-guanidines are non-accelerators, some are faster in their action in a rubber-sulphur mix than is di-phenyl-guanidine, several are substantially the same in accelerating power, and others have their accelerating value so impaired as to be not at all practicable for use from an acceleration standpoint.

One dissimilar-aryl di-substituted-guanidine which I have manufactured and the use of which I have investigated as an accelerator of the rubber vulcanization process when employed in a variety of rubber compounds is p-di-methyl-amino-phenyl-o-tolyl-guanidine. This compound has been prepared for use in the examples as are hereinafter set forth by reacting o-tolyl-mustard oil with p-amino-di-methyl-aniline to produce a thiourea and then desulphurizing the thiourea so formed.

The thiourea desired was prepared preferably by reacting substantially 149 parts (one molecular proportion) of o-tolyl-mustard oil with approximately 136 parts by weight (one molecular proportion) of p-amino-di-methyl-aniline. The reaction that takes place is most conveniently represented as follows:

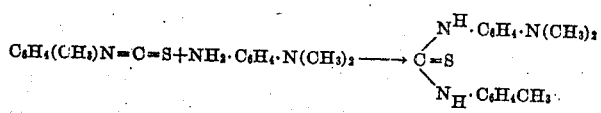

The thiourea so obtained was then desulphurized by treatment with a lead compound while warming under pressure in the presence of ammonia. Preferably, the ammonia was used in the form of an alcoholic solution thereof. The heating of the mass was continued for a period of time necessary to produce substantially complete combination of the substances, whereupon the mixture was allowed to cool, any excess of pressure was released, and the reaction product was filtered. The residuum was then washed with a dilute acid such as hydrochloric acid to separate any guanidine derivative from unchanged thiourea which remained in the product. The acid solution was then rendered slightly alkaline by the addition thereto of a suitable alkali, such as caustic soda solution and the precipitated guanidine derivative so obtained was then filtered and washed and combined with the main bulk of the product obtained from the alcoholic liquor. The product can be further purified, if such treatment be necessary, by dissolving the guanidine derivative in an acid and precipitating as before with caustic. The resulting product, p-di-methyl-amino-phenyl-o-tolyl-guanidine, has the composition represented by the following formula:

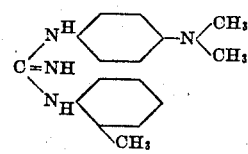

This product, manufactured according to the process as described, has been employed as an accelerator of the rubber vulcanization process by incorporation into a number of different types of rubber compounds, one of which is a so-called pure gum compound. Such a stock comprised:

- 100 parts pale crepe rubber,
- 5 parts zinc oxide,
- 3.5 parts sulphur,
- 0.5 parts p-di-methyl-amino-phenyl-o-tolyl-guanidine.

The above compound was mixed in the usual manner and was then vulcanized by heating portions of the stock for varying times in a press maintained under the temperature given by forty pounds of steam pressure per square inch. The vulcanized pieces were then tested and the following results were obtained:

| Time of cure | Modulus of elasticity at elongation of— | | | Tensile strength at break in lbs./in.$^2$ | Ultimate elongation |
|---|---|---|---|---|---|
| | 300% | 500% | 700% | | |
| 15 min. at 287° F | 124 | 220 | 673 | 2335 | 920% |
| 30 min. at 287° F | 208 | 428 | 1715 | 3640 | 855% |
| 45 min. at 287° F | 263 | 568 | 2460 | 3790 | 775% |

It is seen from the above table that a vulcanized rubber characterized by high tensile strengths results when employing my preferred accelerator by heating the stock mentioned under the conditions set forth for approximately forty-five minutes.

A rubber compound typical of a cushion stock employed in the fabrication of a tire was prepared by mixing in the usual manner a mix comprising

- 100 parts pale crepe rubber,
- 15 parts zinc oxide,
- 3.25 parts sulphur,
- 0.5 parts accelerator.

As the accelerator there was employed p-di-methyl-amino-phenyl-o-tolyl-guanidine. The stock was vulcanized by heating portions thereof for varying times in a press maintained under the temperature given by forty pounds of steam pressure per square inch. The resulting vulcanized portions were then tested and the following results were obtained:

| Time of cure | Modulus of elasticity at elongation of— | | | Tensile strength at break in lbs./in.$^2$ | Ultimate elongation |
|---|---|---|---|---|---|
| | 300% | 500% | 700% | | |
| 20 min. at 287° F | 159 | 361 | 1385 | 2935 | 870% |
| 60 min. at 287° F | 295 | 744 | 3000 | 3585 | 735% |

The accelerator hereinbefore described has also been employed in a rubber compound comprising a typical tread stock. Such a stock contained

- 36.5 parts smoked sheet rubber,
- 20 parts No. 2 amber crepe rubber,
- 25 parts carbon black,
- 2 parts sulphur,
- 1 part of a blended mineral and vegetable oil,
- 1 part stearic acid,
- 3.5 parts mineral rubber,
- 11 parts zinc oxide,
- 0.5 parts p-di-methyl-amino-phenyl-o-tolyl-guanidine.

The above compound, after mixing, was then vulcanized in a press under the conditions described in the previous examples and the vulcanized products were tested and the following results obtained:

| Time of cure | Modulus of elasticity at elongation of— | | Tensile strength at break in lbs./in.$^2$ | Ultimate elongation |
|---|---|---|---|---|
| | 300% | 500% | | |
| 1 hr. 15 min. at 287° F | 1198 | 2960 | 3895 | 600% |
| 1 hr. 45 min. at 287° F | 1343 | 3180 | 3820 | 555% |

A vulcanized product of high tensile strength is seen to result after heating for about 75 minutes under the conditons set forth.

A hard rubber stock comprising the following constituents has also been manufactured.

- 20 parts No. 2 amber crepe rubber,
- 20 parts smoked sheet rubber,
- 5 parts lime,
- 17.5 parts zinc oxide,
- 27.5 parts sulphur,
- 10 parts mineral rubber,
- 0.5 parts of the preferred accelerator set forth.

The above mix was then vulcanized by heating in a press for about 2½ to 2¾ hours at 287° F. An excellent hard rubber was thereby obtained.

The examples hereinbefore given are to be understood as illustrative only and not at all limitative of the scope of my invention. Other means of employing the preferred accelerating compound in rubber compositions, and other means of manufacturing the particular guanidine compound described are apparent to those skilled in the art to which the invention applies. Moreover, my invention is not to be understood as dependent upon the accuracy of any theories set forth by way of explanation of the chemical changes involved in the manufacture of the accelerator described. The invention is to be considered as limited solely by the following claims attached hereto as a part of this invention wherein I intend to claim all novelty inherent in my invention as is permissible in view of the prior art.

It is apparent from the foregoing description that the compounds designated as dissimilar-aryl di-substituted guanidines hereinbefore set forth as rubber vulcanization accelerators, preferably comprise guanidine derivatives wherein different aryl groups or substituted aryl groups are substituted in place of two hydrogen atoms linked to two different nitrogen atoms. Such guanidines are of an entirely different type from those obtained by replacing two hydrogen atoms attached to the same nitrogen atom by two dissimilar groups.

What I claim is:

1. The process of manufacturing vulcanized rubber which comprises heating a mixture of rubber and sulphur in the presence of a small proportion of p-di-methyl-amino-phenyl-o-tolyl-guanidine.

2. A vulcanized rubber product obtained from heating a mixture of rubber and sulphur in the presence of an accelerator comprising p-di-methyl-amino-phenyl-o-tolyl-guanidine.

In testimony whereof I affix my signature.

WINFIELD SCOTT.